United States Patent [19]

Mascioli

[11] Patent Number: 4,568,702
[45] Date of Patent: Feb. 4, 1986

[54] METHOD FOR THE PREPARATION OF SEMI-RIGID POLYURETHANE MODIFIED POLYUREA FOAM COMPOSITIONS

[75] Inventor: Rocco L. Mascioli, Media, Pa.

[73] Assignee: Atlantic Richfield Company, Los Angeles, Calif.

[21] Appl. No.: 722,913

[22] Filed: Apr. 15, 1985

[51] Int. Cl.$^4$ .............................................. C08G 18/14
[52] U.S. Cl. .................................. 521/112; 521/118; 521/129; 521/130; 521/131; 521/167; 521/174; 521/176
[58] Field of Search ............... 521/112, 118, 129, 130, 521/131, 167, 174, 176

[56] References Cited

U.S. PATENT DOCUMENTS 3,751,392 8/1973 Olstowski .............................. 521/99
4,033,908 7/1977 Hopkins et al. ...................... 521/112
4,071,482 1/1978 Hopkins et al. ...................... 521/131

Primary Examiner—Maurice J. Welsh
Attorney, Agent, or Firm—Delbert E. McCaslin

[57] ABSTRACT

Polyurethane modified polyurea foams having a finer cell structure and an increased volume of finished product are prepared by reacting crude organic di- or polyisocyanates with a mixture of polyether polyols and an alkylene or dialkyl carbonate in the presence of a tertiary amine catalyst, a silicone surfactant and a blowing agent selected from water, which reacts with the di- or polyisocyanate to generate $CO_2$, fluorocarbons having a boiling point below 60° C. and mixed with water and methylene chloride mixed with water.

14 Claims, No Drawings

METHOD FOR THE PREPARATION OF SEMI-RIGID POLYURETHANE MODIFIED POLYUREA FOAM COMPOSITIONS

FIELD OF THE INVENTION

The present invention relates to semi-rigid polyurethane modified polyurea foams and a process for their preparation wherein di- or polyisocyanates are reacted with a mixture of polyether polyols and an organic alkylene or dialkyl carbonate in the presence of a tertiary amine catalyst and a blowing agent selected from the group consisting of water which reacts with the isocyanate to generate carbon dioxide, fluorocarbons mixed with water and having a boiling point below 60° C. and methylene chloride mixed with water. The foams which exhibit an improved finished foam appearance, a finer cell structure and an increased volume without loss of physical properties due to the organic carbonate reactant may be used as foam-in-place packaging which gives good shock absorption characteristics for the packaging of expensive products such as electronic equipment. In addition, the presence of the organic carbonate in the reaction mixture gives improved processing through viscosity reduction, especially of the high functional isocyanates, as well as essentially eliminating use of compatabilizing agents with the polyol mixture.

BACKGROUND OF THE INVENTION

The preparation of rigid cross-linked polyurethane foams, polyisocyanurate foams and polyurethane foams which are free of disubstituted ureas that describe the addition of an alkylene carbonate is known.

U.S. Pat. No. 3,751,392 describes a process for the preparation of a polyurethane foam, which is essentially free of disubstituted ureas, employing as the blowing agent an inorganic hydrated metal salt and as heavy metal carboxylate catalyst with the addition of organic carbonates as liquid modifiers.

U.S. Pat. No. 4,033,908 relates to the preparation of a polyisocyanurate by reacting a polyisocyanate in the presence of a blowing agent and a trimerization catalyst with the addition of a plasticizing amount of a nonreactive liquid organic carbonate to improve friability and dimensional stability properties of the foam.

U.S. Pat. No. 4,071,482 describes a highly flame-resistant rigid polyurethane foam having improved friability which is the reaction product of a halogenated polyether polyol having a hydroxyl number of about 300 to 600 and a functionality of 3 to 8 and a polyisocyanate in the presence of a catalyst and a blowing agent, with the foam containing from 1 to 10% by weight of a liquid alkylene carbonate.

SUMMARY OF THE INVENTION

According to the present invention there is provided an improved process for the preparation of semi-rigid polyurethane modified polyurea foam compositions which comprises reacting at a suitable temperature an organic di- or polyisocyanate, a polyether polyol mixture of (1) from about 25 to 75% by weight polyether polyol having a hydroxyl number of 25 to 75 and a functionality of 2 to 3 and (2) correspondingly from about 75 to 25% by weight polyether polyol having a hydroxyl number of about 200 to 800 and a functionality of 4 to 8 and from about 2 to 40 parts by weight, based on the polyether polyol mixture of of an alkylene or dialkyl carbonate, the reaction being carried out in the presence of a tertiary amine catalyst a silicone surfactant and water or a fluorocarbon or methylene chloride mixed with water.

It is a primary object of this invention therefore, to provide an improved process for the preparation of a semi-rigid polyurethane modified polyurea foam composition which has improved and finer cell structure and increased volume or lower density potential without loss of physical properties.

It is another object of this invention to provide an improved reaction system for the preparation of semi-rigid polyurethane modified polyurea foams employing certain polyether polyol mixtures along with an alkylene or dialkyl carbonate in the presence of tertiary amine catalysts, silicone surfactants and particular blowing agents.

These and other objects and advantages of this invention will become apparent from the description of the invention and from the claims.

DETAILED DESCRIPTION OF THE INVENTION

In accordance with the present invention a semirigid polyurethane modified polyurea foam is prepared by reacting at temperatures of from about 0° C. to 50° C. preferably at ambient temperatures or between 25° C. and 30° C. an organic di- or polyisocyanate, a polyether polyol mixture consisting essentially of from about 25 to 75% by weight polyether polyol having a hydroxyl number of about 25 to 75 and a functionality of 2 to 3 and correspondingly from about 75 to 25% by weight polyether polyol having a hydroxyl number of about 200 to 800 and a functionality of 4 to 8, and from about 2 to 40, preferably from 10 to 35, parts by weight, based on the total mixture of the two different polyols, of an alkylene or dialkyl carbonate such as propylene carbonate or dimethyl carbonate, in the presence of a tertiary amine catalyst, a silicone surfactant and a blowing agent selected from water which reacts with the di- or polyisocyanate to generate carbon dioxide, fluorocarbons, having a boiling point below about 60° such as difluorodichloromethane, mixed with water and methylene chloride mixed with water.

The organic di- or polyisocyanates employed as reactants in the present invention include aliphatic, alicyclic and aromatic polyisocyanates characterized by containing two or more isocyanate (NCO) groups per molecule. Such polyisocyanates include the diisocyanates and higher functionality isocyanates, particularly the aromatic isocyanates. Mixtures of polyisocyanates may be used which for example are the crude mixtures of di- and higher functional polyisocyanates produced by phosgenation of aniline-formaldehyde condensates or as prepared by the thermal decomposition of the corresponding carbamates dissolved in a suitable solvent as described in U.S. Pat. Nos. 3,962,302 and 3,919,279, both known as crude MDI or PMDI. The isocyanates may contain impurities or additives such as carbodiimides, isocyanurate groups, urea, hydrolyzable chlorides and biurets. Illustrative of such di- or polyisocyanates which may be employed include, for example, toluene-2,4- and 2,6-diisocyanate or mixtures thereof, diphenylmethane diisycanate 4,4' and 2,4' isomers or mixtures thereof, polymethylene polyphenyl isocyanates, napthalene-1,5-diisocyanate, 3,3'-dimethyl diphenylmethane-4,4'-diisocyanate, triphenylmethane triisocyanate, hexamethylene diisocyanate, 3,3'-ditolylene-4,4-diisocyanate, butylene-1,4-diisocyanate, octylene-1,8-diisocyanate, 4-chloro-1,3-phenylene diisocyanate, 1,4-, 1,3- and 1,2-cyclohexylene diisocyanates and in general the polyisocyanates disclosed in U.S. Pat. No. 3,577,358. The preferred polyisocyanates are the diphenylmethane diisocyanate 2,4' and 4,4' isomers including the 2,2' isomer and the higher functional polyisocyanate polymethylene polyphenyl isocyanate mixtures, which may contain from about 20 to 85 weight percent of the diphenylmethane diisocyanate isomers. Typical of the preferred polyisocyanates are those sold commercially as "Rubinate-M" (Rubicon Chemical Inc.), "Papi" (The Upjohn Co.) and "Mondur-MR" (Mobay Chemicals Co.). In general the organic polyisocyanates will have a molecular weight in the range of between about 100 and 10,000 and will be employed in amounts of from about 100 to 200 parts by weight, preferably 150–200 parts by weight based on the weight of the mixture of polyols.

Polyether polyols used in the mixture of polyether polyols of this invention include (1) those polyols used to prepare "flexible" foams and (2) polyols to prepare "rigid" foams.

The flexible polyether polyols have a hydroxyl number of about 25 to 75 and a functionality of 2 to 3. The polyols may be diols or triols derived from alkylene oxides and may be, for example, made with alkylene oxide mixture such as propylene oxide/ethylene oxide mixtures. Molecular weight will generally range from about 1000 to 6500. Preferably the higher molecular weight polyols are employed. A typical polyether polyol used to prepare a "flexible" polyurethane foam is sold commercially, for example, as "Thanol SF-5505" (Texaco Chemical Co.) and is a 5500 molecular weight triol capped with ethylene oxide containing a high percentage of primary hydroxyl groups.

The "rigid" polyether polyols have a hydroxyl number of about 200 to 800 and a functionality of 4 to 8. The polyols which may have molecular weights of from about 100 to 1500 may be derived from alkylene oxides or mixtures of alkylene oxides such as propylene oxide/ethylene oxide mixtures and may contain aromatic amines. A typical polyether polyol used to prepare "rigid" polyurethane foam is sold commercially, for exmaple, as "Thanol R-650-X" (Texaco Chemical Co.) and is an aromatic amine containing polyether polyol with a hydroxyl number ranging from 440 to 460.

The polyether polyol mixture of the instant invention is a blend of "flexible" and "rigid" polyether polyols. The polyols are blended to give improved handling of materials, lower viscosities and a range of physical properties. The higher functionality polyols will give more cross-linking in the polymer yielding a more rigid foam. Lower functionality polyols have long chain polyether brances and tend to give softer, more flexible foams. Since many of such blends are not completely compatible with each other certain compatibilizing agents such as an ethoxylated nonyl phenol are generally added to give a homogenous solution. Compatibility of the polyether polyol mixture is most important in order to obtain proper processing and pumping of materials. In the instant invention compatibility of the mixture or blend of polyols can be obtained with the addition of the reactant alkylene or dialkyl carbonate displacing the use of such non-ionic surfactant materials such as the ethoxylated nonyl phenol.

The alkylene or dialkyl carbonates which may be employed as reactants in amounts of from about 2 to 40 preferably 10 to 35 parts by weight based on 100 parts of the polyether polyol mixture include the acyclic and cyclic carbonates. Representative carbonates include, for example, dimethyl carbonate, diethyl carbonate, dibutyl carbonate, di-2-ethyhexyl carbonate, diisobutyl carbonate, diallylcarbonate, ethylene carbonate, propylene carbonate, butylene carbonate, styrene carbonate, mixtures thereof and the like. Liquid alkylene or dialkyl carbonates are preferred, however, solid or semi-solid carbonates may be used if liquified via the polyether polyol, isocyanate or other liquid carbonates. As an example, ethylene carbonate which is a solid at room temperature may be employed in admixture with propylene carbonate in which it is soluble. The mixture may range from about 5 to 80 weight percent ethylene carbonate to 95 to 20 weight percent propylene carbonate.

The tertiary amine catalysts which may be employed in amounts of from about 0.5 to 5.0 preferably 1.0 to 3.0 parts by weight based on 100 parts of the polyether polyol mixture include, for example, N-methyl morpholine, dimethylaminocyclohexane, triethylenediamine, bis (dimethylaminoethyl) ether, dimethylethanolamine, trimethylaminopropylethanolamine, trimethylhydroxyethyl ethylenediamine and the like. The preferred catalysts are the alkanolamines such as "Dabco-T" a trimethylhydroxyethylethylenediamine sold commercially by Air Products and Chemicals, Inc.

The preferred blowing agent for use in the instant invention is $CO_2$ which is generated by the addition of water in amounts of from about 25 to 40 parts by weight based on the polyol mixture and which reacts with the isocyanate. Fluorocarbons having a boiling point below about 60° C. mixed with water as well as methylene chloride mixed with water may also be employed. Typical mixtures of organic blowing agents and water may be from 30 to 40 parts water and up to 40 parts fluorocarbon. The fluorocarbons which may be used include, for example, difluorodichloromethane, difluorochloromethane, trichlorofluoromethane, difluoromethane, difluoroethane, difluoropropane, difluorochloroethane, trifluorotrichloroethane, and the like.

The silicone surfactant which act to compatibilize and stabilize the foam reaction mixture is added to the formulation in amounts of from about 1 to 3 parts by weight per 100 parts of polyether polyol mixture. These surfactants are polyalkylene oxide siloxane block copolymers which may contain hydrolyzable SiOC groups such as Union Carbide Corporation's "L-520". Fire retardant chemicals such as tris-chloroethylphosphate or tris-chloropropylphospate may also be added to the foam formulations as required.

The following examples are provided to illustrate the invention in accordance with the principles of this invention but are not to be construed as limiting the invention in any way except as indicated by the appended claims.

In the Examples which follow, the two polyols and organic alkylene or dialkyl carbonate were thoroughly mixed to obtain a homogeneous solution. The tertiary amine catalyst, silicone surfactant and water or fluorocarbon or methylene chloride mixed with water were mixed into the polyol/carbonate solution to give a premix solution with proper proportions of all ingredients. A typical mixture consisted of 105 g of the above premix solution which was stirred rapidly in a high speed agitator for 30 seconds. Isocyanate (145 g) was mixed into the premix for 5 seconds and the reaction mix poured into a cardboard box 12"×12"×4" and allowed to rise freely. Rise times generally ranged from 40 to 50 seconds and tack free times of the foams generally ranged from 65 to 80 seconds. Typical densities of the finished foam were 0.50 lbs/ft$^3$. After complete curing the foam was cut into 2"×2"×1" squares for density and compression measurement according to ASTM D3574. The flammability Butler Chimney Test was run according to ASTM D3014.

A general formulation for the preparation of low density foams according to the invention would be as follows:

|  | Parts By Weight |
| --- | --- |
| A - Component |  |
| Polymeric Isocyanate | 100–200 |
| Fire Retardant | As required |
| B - Component |  |
| Polyol Mixture (Preferably a mix of 45 parts "Thanol R650X" and 45 parts "Thanol SF-5505") | 100 |
| Alkylene or Dialkyl Carbonate | 2–40 |
| Water | 25–40 |
| Tertiary Amine Catalyst "Dabco-T" | 0.5–5.0 |
| Silicone Surfactant "L-520" | 1–3 |
| Organic Blowing Agent (If used) | 0–40 |

EXAMPLE 1

Using the above-noted general formulation, propylene carbonate was added directly to the polyol mixture in amounts varying up to 0 to 40 parts by weight per 100 parts by weight polyether polyol. At 40 parts the foam began to split. Up to 30 parts by weight gave increased volume of finished foam and improved quality as noted by finer cell size. Volume increase over the control (no added propylene carbonate) was 17.8% as measured by volume displacement using inert material (measuring void volume in a standard foam carton) for a foam containing 30 parts by weight propylene carbonate. No change in physical properties were observed due to the propylene carbonate (P.C.) addition as shown below.

| Sample | Parts P.C. | Density lbs/ft$^3$ | Compression at 75% psi | Height Loss after 75% Compression | Deflection at Failure % | Failure (psi) |
| --- | --- | --- | --- | --- | --- | --- |
| A | 0* | 0.59 | 5.2 | 27.1 | 9.6 | 2.1 |
| B | 10 | 0.55 | 5.4 | 23.2 | 9.1 | 2.5 |
| C | 20 | 0.57 | 5.0 | 25.9 | 9.0 | 2.2 |
| D | 30 | 0.58 | 5.4 | 25.7 | 8.9 | 2.5 |

*10 pts. by wt. ethoxylated nonyl phenol added in place of P.C.

An accepted physical property measurement for foams used in the packaging industry is indentation penetration which is an indication of the load bearing property of the foam. A weight bearing 0.51 lbs/in$^2$ is placed on the crown of the foam and the indentation measured. In the above formulations containing 0 parts propylene carbonate and 30 parts propylene carbonate each after 75 seconds after mixing showed an indentation in inches of 2.25 in. and 2.0 in. and a % indentation of foam height of 56.2% and 42.1% respectively.

EXAMPLE 2

A foam formulation consisting of the following was employed to determine the effect of the use of varying amounts propylene carbonate (P.C.) as a replacement for an ethoxylated nonyl phenol (ENP) compatibilizing agent as well as on foam flammability by the Butler Chimney Test (ASTM D3014).

|  | Parts By Weight |
| --- | --- |
| A - Component |  |
| Polymeric Isocyanate (Mobay Chemical "Mondur MR") | 200 (0.3 index) |
| B - Component |  |
| Polyether Polyol ("Thanol R650X") | 45 |
| Polyether Polyol ("Thanol SF5505") | 45 |
| Ethoxylated nonyl phenol | 10 |
| Water | 40 |
| Silicone Surfactant ("L-520") | 3.0 |
| Tertiary Amine Catalyst ("Dabco-T") | 1.0 |

The results are set forth below:

| Run | Foam Formulation | Density (lbs/ft$^3$) | Compression at 75% (psi) | Weight Retained (%) |
| --- | --- | --- | --- | --- |
| 1 | 10 parts ENP | 0.59 | 5.2 | 24.9 |
| 2 | 10 parts P.C. | 0.55 | 5.4 | 25.2 |
| 3 | 20 parts P.C. | 0.57 | 5.0 | 22.6 |
| 4 | 30 parts P.C. | 0.58 | 5.4 | 23.9 |

The addition of the propylene carbonate (P.C.) had no adverse effect on physical properties but increased the amount of foamed material. Propylene Carbonate had no adverse effect on the burning of the foam by the Butler Chimney Test.

EXAMPLE 3

The formulation of Example 2 was employed to determine the effect of using lower amounts of water and polymeric isocyanate with 10 parts propylene carbonate (P.C.) replacing the ethoxylated nonyl phenol (ENP). The results are summarized below:

| Run | Foam Formulation | Density (lbs/ft$^3$) | Compression at 75% (psi) |
| --- | --- | --- | --- |
| 1 | 10 parts EPN, 40 parts H$_2$O, 200 parts isocyanate | 0.52 | 4.01 |
| 2 | 10 parts P.C., 36 parts H$_2$O, 190 parts isocyanate | 0.45 | 3.56 |
| 3 | 10 parts P.C., 32 parts H$_2$O, 180 parts isocyanate | 0.46 | 2.90 |
| 4 | 10 parts P.C., 32 parts H$_2$O, 160 parts isocyanate | 0.48 | 3.38 |
| 5 | 10 parts P.C., 28 parts H$_2$O, 160 parts isocyanate | 0.49 | 3.01 |

The incorporation of propylene carbonate as a reactant enabled reduction of the water/isocyanate levels without any adverse effect on the foams which could lead to significant cost reduction.

EXAMPLE 4

The formulation of example 2 was employed to demonstrate the effect of the fluorocarbon, trichlorofluoromethane, in varying amounts with 40 parts by weight water in the foam formulation with the addition of 10 parts by weight propylene carbonate (P.C.) and with 10 parts by weight ethoxylated nonyl phenol (ENP) compatibilizer in the absence of propylene carbonate. The results are summarized below:

| Fluorocarbon | P.C. 10 pts. by wt. | | | ENP 10 pts. by wt | | |
|---|---|---|---|---|---|---|
| | 10 | 30 | 40 | 10 | 30 | 40 |
| Density | 0.48 | 0.46 | 0.47 | 0.68 | 0.65 | 0.89 |
| 50% Compression (psi) | 1.08 | 0.84 | 0.94 | 1.39 | 0.9 | 0.75 |
| 75% Compression (psi) | 5.08 | 4.66 | 4.78 | 7.63 | 5.64 | 6.39 |
| Rise Height (inches) | 8.4 | 8.8 | 8.5 | 7.3 | 7.8 | 4.1 |

EXAMPLE 5

A solution of ethylene carbonate and propylene carbonate was prepared by dissolving 25 g. ethylene carbonate in 75 g. propylene carbonate. To a mixture of 45 g. polyether polyol ("Thanol R650X") and 45 g. polyether polyol ("Thanol SF5505") was added 10 g. of the ethylene carbonate/propylene carbonate solution. This mixture was thoroughly stirred for 30 seconds after which 40 g. water, 3.0 g. silicone surfactant "L-520" and 4.0 g. dimethylethanolamine were added. This premix was stirred well at mixer speeds of 3000 rpm. To the premix was added 200 g. polymeric isocyanate (Mobay "Mondur MR"). The reaction mix was stirred for 5 seconds and poured rapidly into a cardboard box 12"×12"×4". Rise time was 50 seconds and tack free time was 75 seconds. A fine celled semi-rigid foam was obtained having a density of 0.52 lbs/ft$^3$.

EXAMPLE 6

The procedure and formulation of Example 2 to give a foam was repeated except that 10 parts by weight diethyl carbonate was used to replace the ethoxylated nonyl phenol compatibilizing agent. No organic blowing agent was employed. To the polyol, diethyl carbonate, water, silicone surfactant and amine catalyst premix was added 200 parts by weight polymeric isocyanate ("Mondur MR"). The reaction mass was stirred for five seconds and then poured into a cardboard box. The foaming mass rose very quickly within 50–55 seconds and became tack free within 75–80 seconds. Density of the finished foam was 0.50 lbs/ft$^3$. 75% compression was 5.2 psi.

EXAMPLE 7

The procedure and formulation of Example 2 to give a foam was repeated except that 10 parts by weight butylene carbonate was employed instead of the ethoxylated nonyl phenol. No organic blowing agent was employed. The ingredients were well stirred and the polymeric isocyanate added. The reaction mass rise time was 52 seconds and tack free time was 75 seconds. Density of the foam was 0.51 lbs/ft$^3$. 75% compression was 5.1 psi.

We claim:

1. A method for the preparation of a semi-rigid polyurethane modified polyurea foam composition which comprises reacting at a temperature of from about 0° C. to 50° C., an organic di- or polyisocyanate, a polyether polyol mixture consisting essentially of from about 25 to 75 percent by weight polyether polyol having a hydroxyl number of about 25 to 75 and a functionality of 2 to 3 and correspondingly from about 75 to 25 percent by weight polyether polyol having a hydroxyl number of about 200 to 800 and a functionality of 4 to 8, and from about 2 to 40 parts by weight based on the polyether polyol mixture of an alkylene or dialkyl carbonate, the reaction being carried out in the presence of from about 0.5 to 5.0 parts by weight based on the polyether polyol of a tertiary amine catalyst, from about 1 to 3 parts by weight per 100 parts polyether polyol of a polyalkylene oxide siloxane block copolymer surfactant which may contain hydrolyzable SiOC groups and a blowing agent selected from the group consisting of water which reacts with the di-or polyisocyanate to generate carbon dioxide, fluorocarbons having a boiling point below 60° C. and mixed with water and methylene chloride mixed with water.

2. A method according to claim 1 wherein the temperature is in the range of from 25° C. to 30° C.

3. A method according to claim 1 wherein the di- or polyisocyanate is a mixture of diphenylmethane diisocyanate and the higher functionality polymethylene polyphenyl isocyanates.

4. A method according to claim 1 wherein the polyether polyol mixture consists of 50 parts by weight polyol having a functionality of 2 to 3 and 50 parts by weight polyol having a functionality of 4 to 8.

5. A method according to claim 1 wherein the alkylene or dialkyl carbonate is employed in an amount of from 10 to 35 parts by weight.

6. A method according to claim 1 wherein the alkylene carbonate is propylene carbonate.

7. A method according to claim 1 wherein the alkylene carbonate is butylene carbonate.

8. A method according to claim 1 wherein the alkylene carbonate is a mixture of ethylene carbonate and propylene carbonate.

9. A method according to claim 1 wherein the dialkyl carbonate is diethyl carbonate.

10. A method according to claim 1 wherein the blowing agent is trichlorofluoromethane mixed with water.

11. A method according to claim 1 wherein the blowing agent is difluorodichloromethane mixed with water.

12. A method according to claim 1 wherein the tertiary amine catalyst is a dialkylethanolamine.

13. A method according to claim 1 wherein the tertiary amine catalyst is trimethylhydroxyethylethylenediamine 14. A method for the preparation of a semi-rigid polyurethane modified polyurea foam composition which comprises reacting at a temperature of from 25° C. to 30° C. a mixture of diphenylmethane diisocyanate, and higher functional polymethylene polyphenyl isocyanates, a polyether polyol mixture consisting of 50 percent by weight polyether polyol having a hydroxyl number of about 25 to 75 and a functionality of 2 to 3 and 50 percent by weight polyether polyol having a hydroxyl number of about 200 to 800 and a functionality of 4 to 8 and from 10 to 35 parts by weight based on the polyether polyol mixture of propylene carbonate, the reaction being carried out in the presence of from about 1 to 3 parts by weight based on the polyether polyol of a trimethylhydroxyethyl ethylenediamine catalyst, from 1 to 3 parts by weight per 100 parts polyether polyol of a polyalkylene oxide siloxane block copolymer surfactant which may contain hydrolyzable SiOC groups and a blowing agent consisting of water which reacts with the isocyanate to generate carbon dioxide.

* * * * *